US 6,626,485 B2

(12) United States Patent
Tamura et al.

(10) Patent No.: US 6,626,485 B2
(45) Date of Patent: Sep. 30, 2003

(54) VEHICLE SUN ROOF SYSTEM

(75) Inventors: Michio Tamura, Wako (JP); Masaharu Ohnishi, Wako (JP); Tatsuya Ohara, Wako (JP); Tatsuaki Uehara, Tochigi-ken (JP); Koichi Hotta, Tochigi-ken (JP)

(73) Assignees: Honda Giken Kogyo Kabushiki Kaisha, Tokyo (JP); Yachiyo Kogyo Kabushiki Kaisha, Saitama-ken (JP)

( * ) Notice: Subject to any disclaimer, the term of this patent is extended or adjusted under 35 U.S.C. 154(b) by 0 days.

(21) Appl. No.: 10/251,614

(22) Filed: Sep. 20, 2002

(65) Prior Publication Data

US 2003/0075956 A1 Apr. 24, 2003

(30) Foreign Application Priority Data

| Oct. 11, 2001 | (JP) | 2001-313497 |
| Dec. 25, 2001 | (JP) | 2001-390985 |
| Sep. 21, 2001 | (JP) | 2001-288004 |
| Nov. 30, 2001 | (JP) | 2001-365482 |

(51) Int. Cl.$^7$ ............................................. B60J 7/05
(52) U.S. Cl. .............................. 296/216.08; 296/223
(58) Field of Search ............... 296/216.06–216.08, 296/221–223

(56) References Cited

U.S. PATENT DOCUMENTS

| 4,746,165 A | * | 5/1988 | Fuerst et al. ................. 296/223 |
| 4,869,548 A | * | 9/1989 | Nagata et al. ............... 296/221 |
| 4,923,246 A | * | 5/1990 | Takahashi et al. .......... 296/221 |

FOREIGN PATENT DOCUMENTS

| JP | 3-121926 | 5/1991 |
| JP | 5-23208 | 4/1993 |
| JP | 5-29928 | 7/1993 |

OTHER PUBLICATIONS

Patent Abstract, No. 03–121926, Published May 23, 1991.
Patent Abstract, No. 61–085222, Published Apr. 30, 1986.
Patent Abstract, No. 05–29928, Published Jul. 30, 1993.

* cited by examiner

Primary Examiner—Dennis H. Pedder
(74) Attorney, Agent, or Firm—MacPherson Kwok Chen & Heid LLP

(57) ABSTRACT

In an automotive sun roof system, each of the front sliders is provided with at least three laterally extending slide shoes including a front inboard slide shoe, a rear inboard slide shoe and a front outboard slide shoe located intermediate between the inboard slide shoes with respect to a fore-and-aft direction, and the guide rail is provided with an inboard side defining an inboard guide slot and an outboard side defining an outboard guide slot adapted to receive the corresponding slide shoes, the outboard side of the guide rail being provided with a front end which is rearwardly offset from that of the inboard side of the guide rail. Thus, the front end of each guide rail is advanced as much as possible without increasing the exposure of such parts to the moisture that may drip from the fixed roof panel and/or moveable panel by taking into account the rounded shape of the opening in the fixed roof panel. Therefore, the position of the front sliders for the moveable panel can be advanced by a corresponding degree, and the overhang of the moveable panel from the front sliders can be minimized.

11 Claims, 11 Drawing Sheets

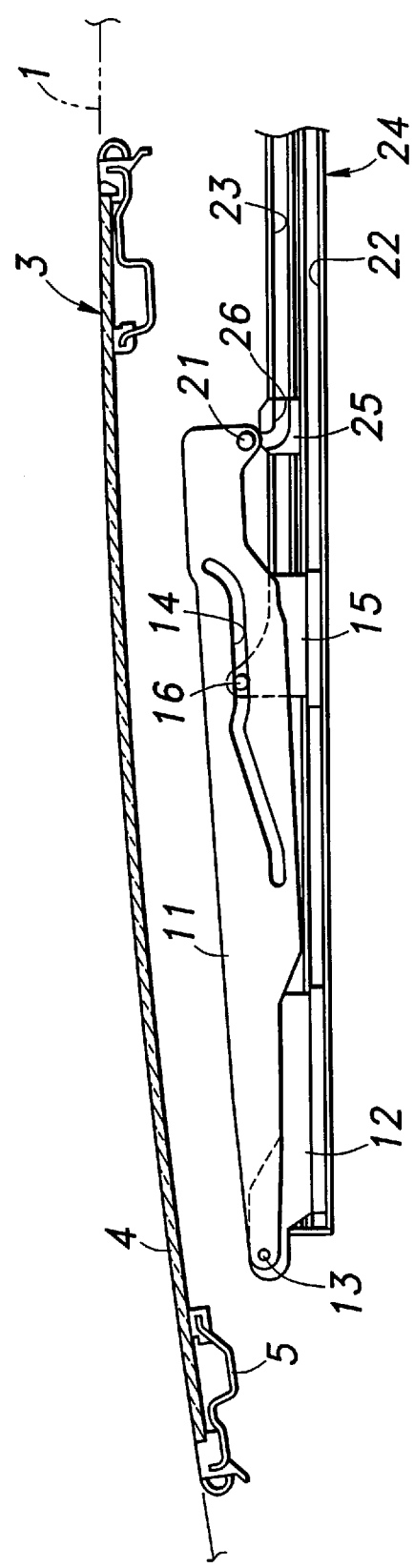

VEHICLE SUN ROOF SYSTEM

TECHNICAL FIELD

The present invention relates to a vehicle sun roof system, and in particular to a vehicle sun roof system provided with an improved slide mechanism for a moveable sun roof panel.

BACKGROUND OF THE INVENTION

A vehicle sun roof system is typically provided with a moveable sun roof panel that can slide in a fore-and-aft direction to open and close an opening formed in a fixed roof panel of the vehicle. A pair of guide rails are provided in a lower part of the fixed roof panel on either side of the opening, and the moveable panel is provided with four sliders which are slidably engaged by the guide rails.

Because the moveable panel is supported solely by these sliders, to maximize the support rigidity of the moveable panel, it is preferable to attach the sliders to the front end and rear end of the moveable panel, and minimize the forward and rearward overhangs of the moveable panel that extend beyond the sliders.

However, the guide rails are required to be protected from moisture in order to ensure a smooth operation thereof, and the front end of each guide rail is required to be set back from the front edge of the opening by an appropriate distance. In particular, when the corners of the front end of the opening is rounded or is provided with a relatively large radius of curvature for aesthetic reasons, the front ends of the guide rails are required to be substantially set back from the front end of the opening in the roof panel. Modern automotive design is often such that the front window shield is strongly curved so that the front end of the opening in the roof has to be rounded accordingly.

In such a case, the front sliders are required to be set back from the front edge of the moveable panel to match the guide rails which are set back from the front end of the opening, and this results in a substantial front overhang of the moveable panel. Such an overhang is undesirable because the support structure has to be strengthened to ensure the required support rigidity. This is detrimental to compact, light-weight economical design of the vehicle sun roof system.

In such a guide structure, dimensional errors are inevitable between the guide rail and the slider, and it is customary to fit resilient shoes on the sliders so as to eliminate a play that may exist between the guide rail and the slider and ensure a smooth movement of the slider along the guide rail. For instance, Japanese utility model publication 5-29928 discloses a structure in which each slider shoe is provided with an inner wall portion which resiliently fits onto a stay member attached to a moveable panel, an outer wall portion which resiliently engages the guide slot and a space between the inner and outer wall portions to accommodate the resilient deformations of the inner and outer wall portions.

However, this arrangement requires a space between the inner and outer wall portions, and causes a vertical dimension of the guide structure to be increased. This is detrimental to the effort to minimize the vertical dimension of the sun roof system to provide a large head clearance in the passenger compartment of the vehicle without increasing the height of the roof panel.

In a sun roof system which is capable of both a slide open motion and a tilt up motion, it is necessary to prevent the fore-and-aft movement of the moveable panel while the moveable panel is anywhere between the fully closed position and a fully tilted up position. Japanese patent publication No. 05-23208 discloses a lock lever pivotally attached to a front slider via a laterally extending pin shaft, and provided with a front end which can selectively engage an opening provided in the guide rail.

According to this conventional arrangement, when the rear end of the moveable panel tilts down as a step preliminary to sliding rearward, the moveable panel pushes down the rear end of the lock lever, causing the front end to be disengaged from the opening and allowing the moveable panel to slide rearward. Conversely, when the moveable panel slides forward and approaches its fully closed position, the rear end of the moveable panel is tilted up and causes the lock lever to engage the opening. However, because the front end of the lock lever consists of a simple, downwardly extending projection, there was a concern that the lock lever may be inadvertently disengage from the opening, particularly when the rear end of the moveable panel tilts down and the projection of the lock lever tilts rearward as a result.

According to a sun roof system of an inner slide type such as the one disclosed in Japanese patent laid open publication No. 03-121926, the moveable panel is stowed in a space defined under the fixed roof panel behind the opening defined in the fixed roof panel when it is slid rearward toward its fully open position. Therefore, when moving the moveable panel rearward from its fully closed position, it is necessary to tilt down the rear end of the moveable panel, and it is typically accomplished by guiding a pin shaft laterally extending from a stay member depending from the moveable panel along a vertical slot for tilting the rear end of the moveable panel and along a substantially horizontal path for sliding the moveable pane rearward.

Conventionally, the tilt down motion was accomplished by dropping the laterally extending pin shaft into the horizontal guide slot via an opening passed through an opening formed in an upper wall of the guide rail defining the guide slot. Therefore, the transition from the tilt down motion to the slide motion was not effected in as smooth a fashion as desired, and a striking noise may even be produced when the laterally extending pin shift drops into the guide slot.

BRIEF SUMMARY OF THE INVENTION

In view of such problems of the prior art, a primary object of the present invention is to provide an improved sun roof system having a favorable slide guide mechanism that ensures a smooth movement of the moveable panel and a high support rigidity for the moveable panel at the same time.

A second object of the present invention is to provide an improved sun roof system which can operate smoothly even when a camber or a warping is present in the guide rail.

A third object of the present invention is to provide an improved sun roof system which can operate smoothly and requires a small vertical dimension.

A fourth object of the present invention is to provide an improved sun roof system which is capable of both a tilt up motion and a slide motion in a highly reliable manner.

A fifth object of the present invention is to provide an improved sun roof system which allows the moveable panel to be moved into a space defined under the fixed roof panel immediately behind the opening in a highly smooth and noiseless manner.

According to the present invention, such objects can be accomplished by providing a vehicle sun roof system, comprising: a fixed roof panel defining an opening having a rounded shape; a pair of guide rails extending on the fixed roof panel in a fore-and-aft direction along either side of the opening; and a moveable panel having a pair of sliders on each side thereof, the sliders being slidably engaged by a corresponding one of the guide rails one in the front and the other in the rear; each of the front sliders being provided with at least three laterally extending slide shoes including a front inboard slide shoe, a rear inboard slide shoe and a front outboard slide shoe located intermediate between the inboard slide shoes with respect to a fore-and-aft direction, the guide rail being provided with an inboard side defining an inboard guide slot and an outboard side defining an outboard guide slot adapted to receive the corresponding slide shoes, the outboard side of the guide rail being provided with a front end which is rearwardly offset from that of the inboard side of the guide rail.

Thus, the front end of each guide rail is advanced as much as possible without increasing the exposure of such parts to the moisture that may drip from the fixed roof panel and/or moveable panel by taking into account the rounded shape of the opening in the fixed roof panel. Therefore, the position of the front sliders for the moveable panel can be advanced by a corresponding degree, and the overhang of the moveable panel from the front sliders can be minimized. This contributes to the increase in the mechanical rigidity and strength of the front part of the moveable panel. Each of the front sliders may further comprise a rear outboard slide shoe provided on an outboard side of the front slider at a substantially same fore-and-aft position as the rear inboard slide shoe to ensure a laterally balanced support for the front slider.

As there are three slide shoes which are arranged along a longitudinal line, a camber in the guide rail or a convex surface of the guide rail as seen from a side may prevent a smooth movement of the corresponding front slider. It can be avoided if the front outboard slide shoe is provided with a resiliently deformable lower surface. Such a deformable lower surface can be accomplished if the front outboard slide shoe is fitted on a tongue member extending laterally from a main part of the front slider in an outboard direction, and a recess is formed in a bottom surface of the tongue member to provide a flexibility to a part of the outboard slide shoe extending over the recess. According to this arrangement, the deformation of the wall of the slide shoe can be accommodated by the recess provided in the corresponding part of the slider which typically consists of a tongue member, and the overall thickness of the shoe can be minimized.

If the guide rail is provided with a concave surface as seen from a side, a smooth movement of the corresponding front slider can be ensured if the front inboard slide shoe and rear inboard slide show are each provided with a resiliently deformable upper surface. Again, such a deformable upper surface can be accomplished if each of the front and rear inboard slide shoes is fitted on a tongue member extending laterally from a main part of the front slider in an inboard direction, and a recess is formed in a top surface of the tongue member to provide a resiliency to a part of the inboard slide shoe extending over the recess.

The flexibility in the upper and/or lower surfaces of the slide shoes is effective in removing a play for the moveable panel in the vertical direction. A play in the lateral direction for the moveable panel can be removed if at least one of the slide shoes is provided with a resilient portion on a side end thereof for resiliently engaging a bottom surface of a corresponding one of the guide slots.

According to a preferred embodiment of the present invention, the sun roof system further comprises a lock lever pivotally supported by one of the front sliders via a laterally extending pin shaft and provided with a front end having a downwardly depending projection, and an engagement portion provided in a part of the corresponding guide rail for engaging the projection in a fully closed state of the moveable panel, the lock lever being provided with a cam surface for rocking the locking lever out of engaging from the engagement portion when a rear end of the moveable panel is tilted down as a step preliminary to a rearward slide motion, at least one of the engagement portion and the projection being provided with an overhang for securely engaging the projection with the engagement portion. The engagement portion may include an opening formed in the guide rail.

Because of the angle of the projection is determined such that the projection engages the opening with an overhang portion thereof, the engagement between the projection and opening can be ensured when the moveable panel is subjected to a rearward force but is required to be prevented from a rearward movement. Thus, a secure engagement between the moveable panel and the fixed roof panel can be ensured when such an engagement is needed. This is particularly significant when the sun roof system is adapted to both a slide motion and a tilt up motion because the tilt up motion is typically effected by a rearward force acting on a suitable cam mechanism, and it is essential that during the tilt up motion the moveable panel is prevented from moving rearwardly. Thus, a secure engagement between the moveable panel and the fixed roof panel can be ensured when the moveable panel is fully closed and being tilted up.

For the moveable panel to be able to move rearwardly, it needs to tilt down so that it may be stowed in a space defined under the fixed roof panel immediately behind the opening. Such a motion can be accomplished by a corresponding guide slot formed in the guide rail. According to a preferred embodiment of the present invention, the guide rail includes a vertical slot for guiding a laterally extending pin shaft attached to a rear part of the moveable panel to tilt down a rear end of the moveable panel and a horizontal slot extending rearward from a lower part of the vertical slot to accommodate a rearward sliding movement of the moveable panel, the guide rail including a section made of a separate member which defines at least a part of the vertical slot and a part of the horizontal slot connected to the lower part of the vertical slot. To prevent noises when the laterally extending pin shaft is guided by such a guide slot, the separate member preferably includes a part made of plastic material.

BRIEF DESCRIPTION OF THE DRAWINGS

Now the present invention is described in the following with reference to the appended drawings, in which:

FIG. 2 is a longitudinal sectional view of the sun roof system when it is fully closed;

DETAILED DESCRIPTION OF THE PREFERRED EMBODIMENTS

Figure 1:
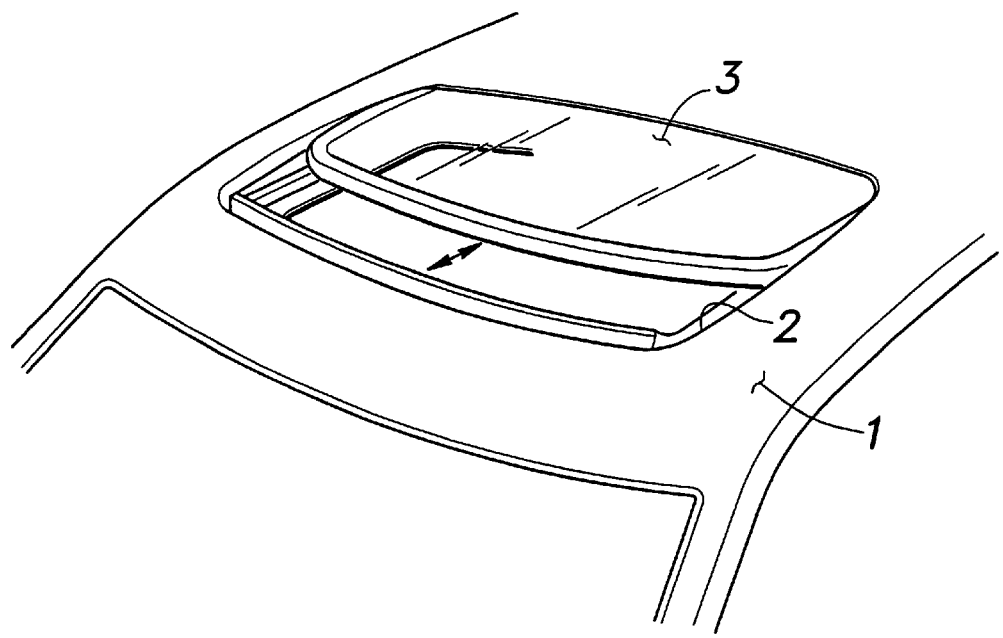
FIG. 1 is a fragmentary external perspective view of a vehicle sun roof system embodying the present invention.

FIG. 1 is a fragmentary perspective external view of a sun roof system embodying the present invention. A fixed roof panel 1 of a vehicle is formed with a substantially rectangular, somewhat laterally extended opening 2 which is selectively closed by a moveable panel 3 conformal to the inner peripheral profile of the opening 2.

Figure 3:
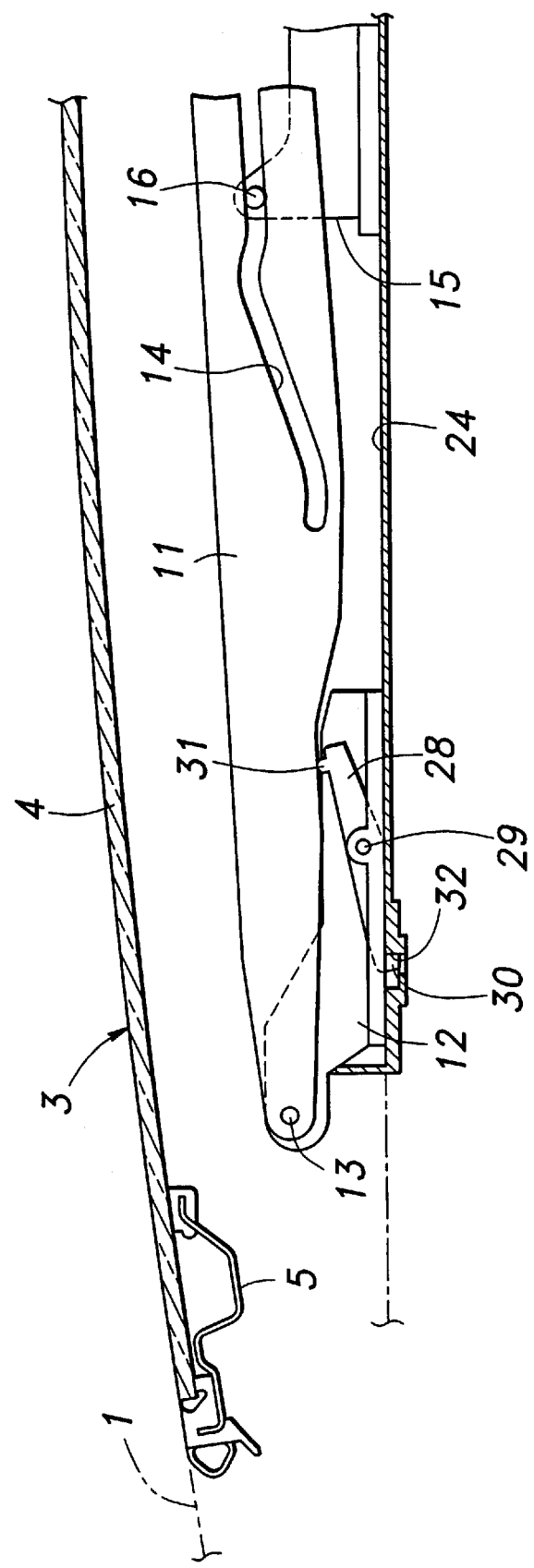
FIG. 3 is a somewhat enlarged longitudinal sectional view of the sun roof system when it is fully closed.
Figure 8:
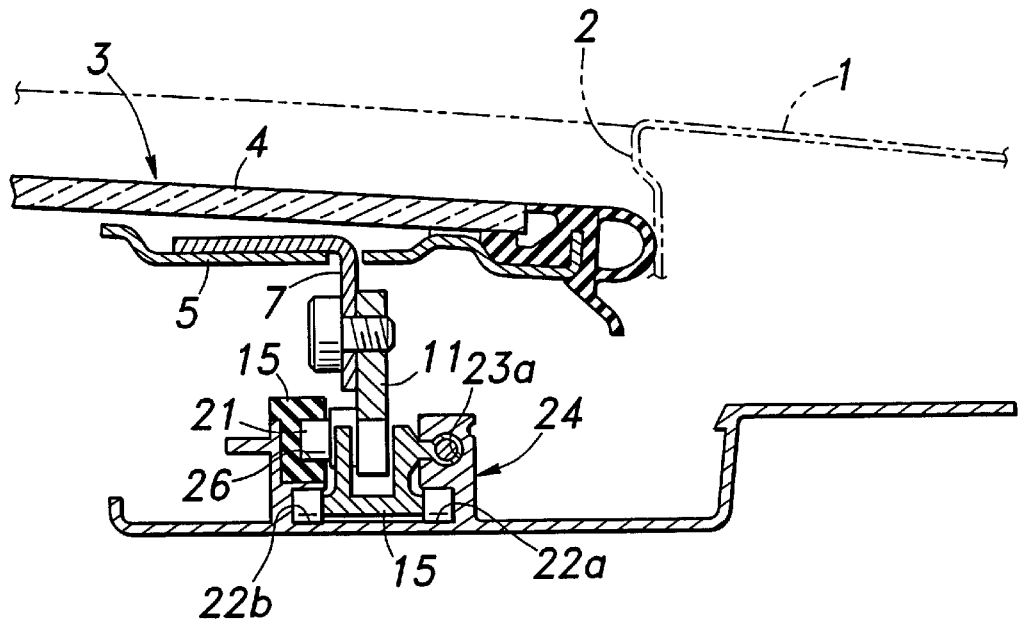
FIG. 8 is a fragmentary cross sectional view taken along line VIII—VIII of FIG. 5.

Referring to FIGS. 2 and 3, the moveable panel 3 comprises a glass panel 4, and a glass retainer 5 made of metallic material and attached to the outer periphery of the lower surface of the glass panel 4 by using a bonding agent. To each side of the lower surface of the glass retainer 5 is attached a side plate 11 via a stay member 7 (FIG. 8). A front slider 12 is attached to the front end of each side plate 11 via a pin shaft 13. A rear slider 15 is provided with a laterally extending pin shaft 16 which fits into a cam slot 14 formed in an intermediate part of each side plate 11 so that the tilt motion and slide motion of the moveable panel 3 may be effected as will be described hereinafter. The front and rear sliders 12 and 15 are engaged by guide rails 24 attached to an inner part of the fixed roof panel 1 so as to be slidable in the fore-and-aft direction.

The guide rail 24 is provided with a pair of lower guide slots 22a and 22b laterally opposing each other and a pair of upper guide slots 23a and 23b also laterally opposing each. The front part of the lower guide slots 22a and 22b engage the front slider 12. The rear part of the lower guide slots 22a and 22b engage the rear slider 15 and the rear part of one of the upper guide slots 23b engages a laterally extending pin shaft 21 provided in a rear end of the side plate 11 when the moveable panel 3 is tilted down. The other upper guide slot 23a receives a push-pull cable having one end attached to the rear slider 15.

Figure 9:
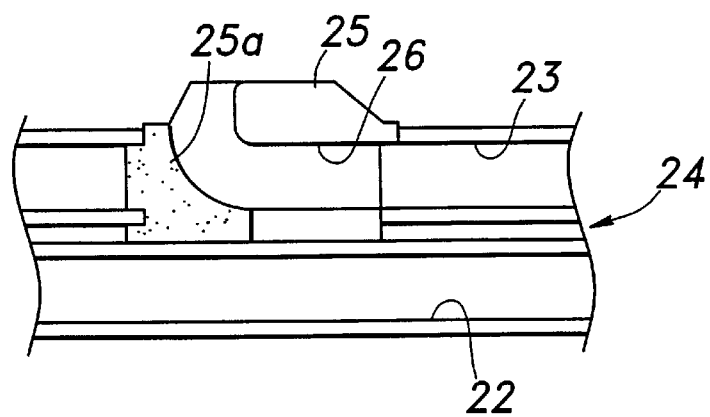
FIG. 9 is a fragmentary side view of an alternate embodiment of the guide slot arrangement.

A guide member 25 is provided in an appropriate part of the upper guide slot 23b, and defines a curved guide slot 26 including a substantially vertical upper section and a curved section smoothly connecting the vertical upper section with the associated part of the corresponding upper guide slot 23b. The curved guide slot 26 is provided with a substantially same width as the upper guide slot 23b, and can smoothly guide the pin shaft 21 between the curved guide slot 26 and upper guide slot 23b. The guide member 25 is made of plastic material, and this contributes to the elimination of noises as the pin shaft 21 moves between the curved guide slot 26 and the upper guide slot 23b. However, it may also be partly or entirely made of metallic material as illustrated in FIG. 9. In the former case, the outer periphery of the curved guide slot 26 is defined by plastic material as denoted by numeral 25a while the remaining part is made of metallic material.

A lock lever 28 is connected to the front slider 12 to prevent the fore-and-aft movement of the moveable panel 3 at the front most position thereof when it is engaged. This lock lever 28 is pivotally supported by the front slider 12 via a laterally extending pin shaft 29 in an intermediate part thereof so as to be tiltable like a see-saw. The lock lever 28 is provided with an engagement projection 30 depending from a front end thereof, and a pusher projection 31 directed upward at a rear end thereof. A bottom part of the guide rail 24 is provided with an engagement hole 32 for receiving the engagement projection 30 of the lock lever 28.

The lock lever 28 is resiliently urged by a torsion coil spring (not shown in the drawing) wound around the pin shaft 29 in the direction to fit the engagement projection 30 into the engagement hole 32. Therefore, when the moveable panel 3 is fully closed, as shown in FIG. 3, the engagement projection 30 is received in the engagement hole 32 so that the moveable panel 3 is locked against the fore-and-aft movement in its fully closed position and in its tilted up position. Also, under this condition, the lower edge of each side plate 11 does not apply any force to the pusher projection 31 of the corresponding lock lever 28.

Figure 4:
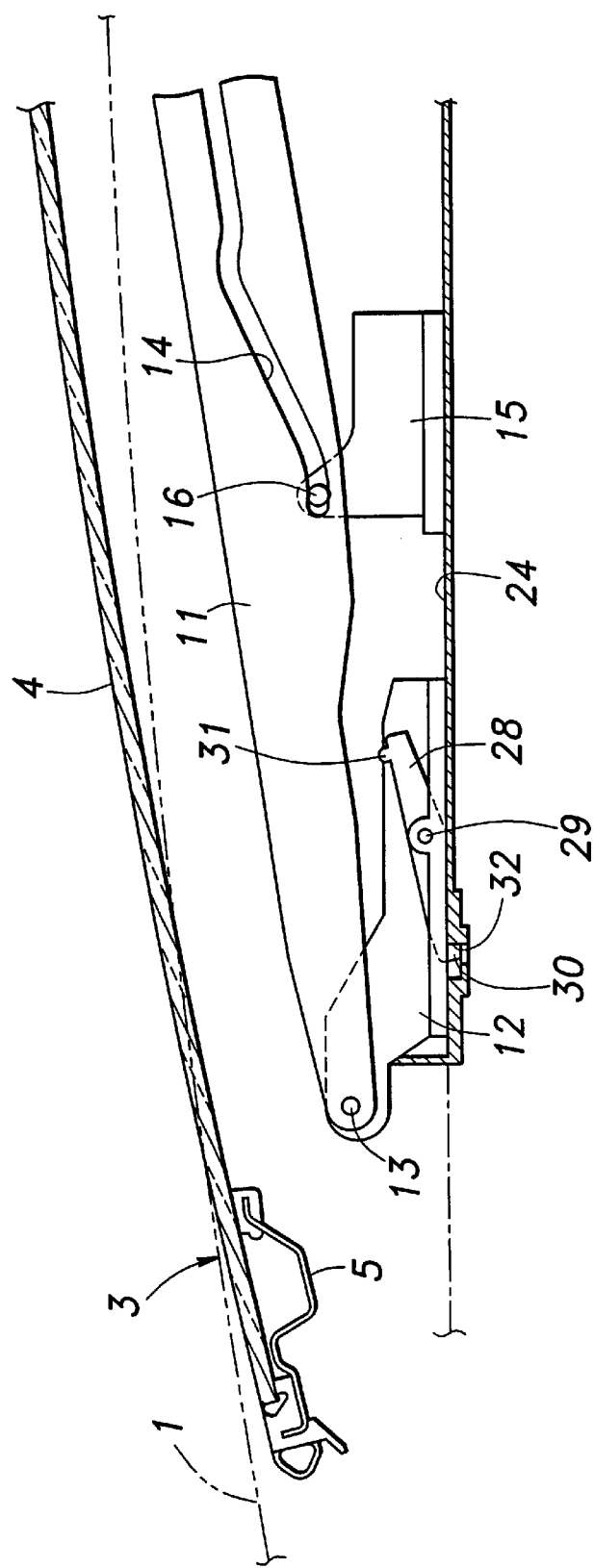
FIG. 4 is a view similar to FIG. 3 showing the state of the sun roof system when the moveable panel is tilted up.
Figure 5:
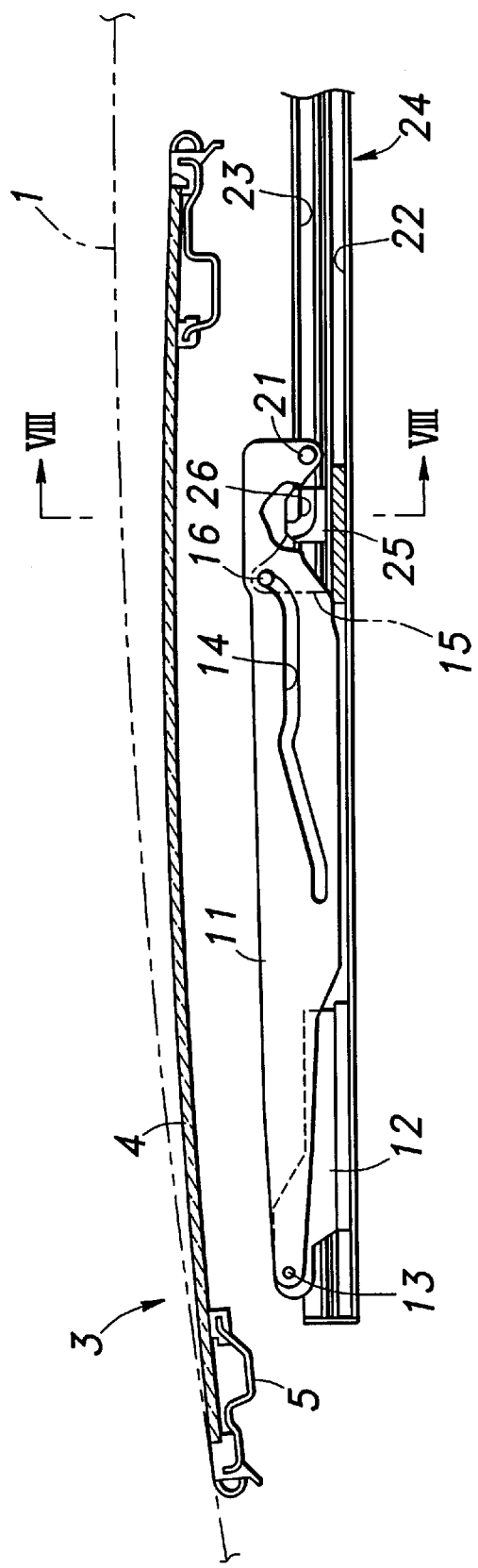
FIG. 5 is a view similar to FIG. 2 showing the state of the sun roof system when the moveable panel is tilted down.
Figure 6:
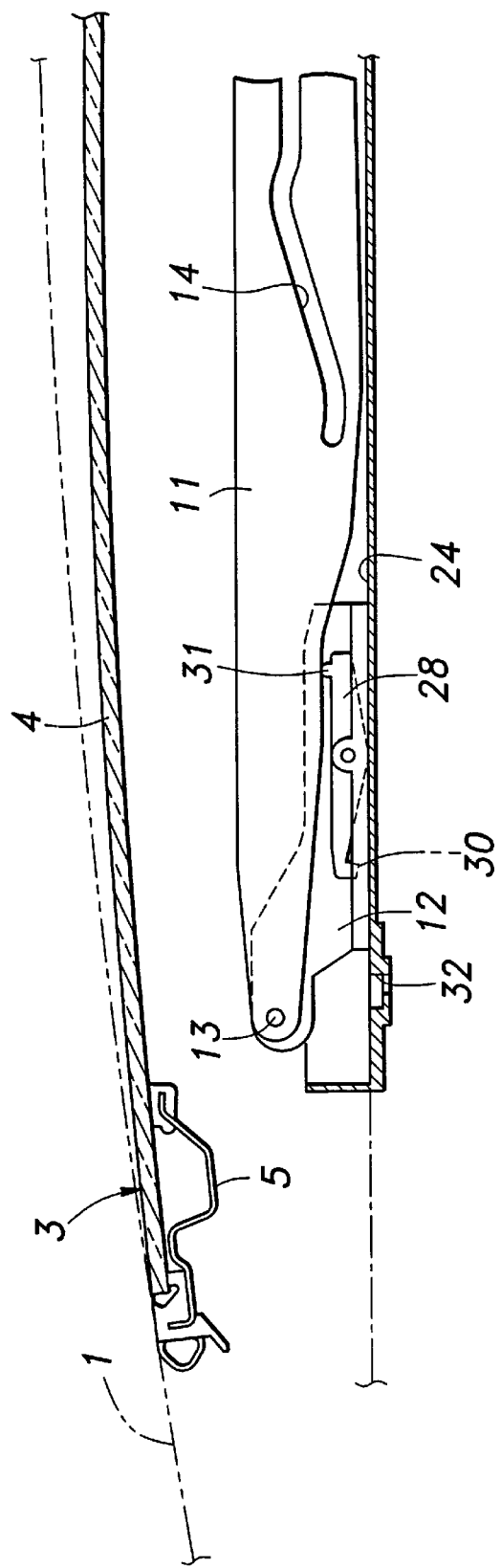
FIG. 6 is a view similar to FIG. 3 showing the state of the sun roof system when the moveable panel is tilted down.

When the moveable panel 3 is desired to be tilted up, the rear slider 15 is actuated in the forward direction, for instance, by a push-pull cable connected to the rear slider 15, and each side plate 11 is tilted around the pin shaft 13 with its rear end elevated owing to the interaction between the pin shaft 16 and cam slot 14 as illustrated in FIG. 4, This causes the lower edge of the side plate 11 to move away from the pusher projection 31 of the lock lever 28. Therefore, the lock lever 28 maintains its position with the engagement projection 30 kept received in the engagement hole 32, and the moveable panel 3 is allowed to be tilted with its rear end up while its fore-and-aft movement is prevented.

When the moveable panel 3 is desired to be tilted down, the rear slider 15 is pulled rearward, and the moveable panel 3 tilts down until the moveable panel 3 becomes flush with the fixed roof panel 1 owing to the interaction between the pin shaft 16 and cam slot 14.

When the moveable panel 3 is desired to be slid rearward and opened, the rear slider 15 is pulled further rearward, and by the pin shaft 21 being guided vertically downward along the vertical upper section of the curved guide slot 26 of the guide member 25, a slight tilt down of the rear part of the moveable panel 3 from a position lush with the fixed roof panel 1 around the pin shaft 13 is effected. This causes the lower edge of the side plate 11 to push down the pusher projection 31 and the engagement projection 30 to be disengaged from the engagement hole 32. Thus, the moveable panel 3 is allowed to be slid rearward and opened as desired with the engagement projection 30 disengaged from the engagement hole 32 and the pin shaft 21 guided along the curved guide slot 26 of the guide member 25 and then along the upper guide slot 23b of the guide rail 24. The moveable panel 3 in its open position is stowed in a space defined between the lower surface of the fixed roof panel 1 and an inner frame supporting the guide rail 24. Under this condition, the movable panel 3 is kept from rattling or otherwise moving vertically with the side plate 11 pivotally attached to the front slider 12 which is in turn firmly guided by the lower guide slots 22a and 22b and the pin shaft 21 snugly received in the upper guide slot 23b.

Figure 7:
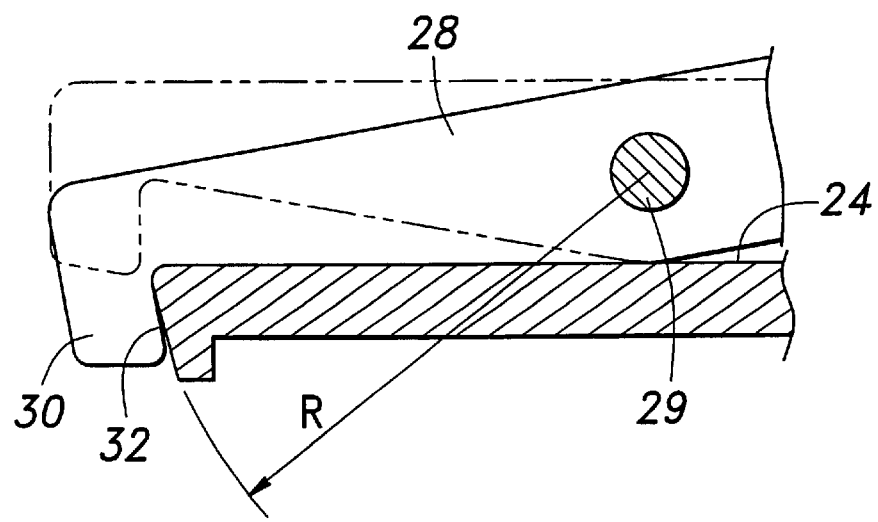
FIG. 7 is an enlarged fragmentary side view of a lock mechanism for preventing the fore-and-aft movement of the front slider.

As best illustrated in FIG. 7, the inner periphery of the engagement hole 32 engaged by the engagement projection 30 of the lock lever 28 is provided with a slanted profile which follows the arcuate motion of the engagement projection 30 around the pin shaft 29 of the lock lever 28. In particular, the upper part of the profile is provided with a slight overhang, and the corresponding edge of the projection 30 is also provided with an overhang. This provides a secure engagement between the engagement projection 30 and engagement hole 32 when the engagement projection 30 of the lock lever 28 is urged rearward, and prevents an inadvertent disengagement between the engagement projection 30 and engagement hole 32. Even when the rear end of the moveable panel 3 is tilted down, the overhang of the engagement projection 30 still remains with respect to the opposing edge of the opening 32 and the engagement between them is ensured.

When the moveable panel 3 is opened or the moveable panel is tilted up while some moisture such as rainwater is still left on the vehicle roof, it is possible that moisture which may be deposited on fixed roof panel or the moveable panel drops onto the inner frame. The inner frame is typically provided with a suitable drain structure, and the moisture may be removed without interfering with components of the sun roof system. However, the front ends of the guide rails should be protected from such moisture. Therefore, the front ends of the guide rails should be set back to a relatively rearward position, but this requires the front sliders to be located somewhat rearward from the front end of the moveable panel, and this increases the amount of overhang of the front part of the moveable panel. Such an overhang reduces the rigidity in the support structure for the moveable panel.

To eliminate this problem and maximize the rigidity in the support structure for the moveable panel, the front slider shoe arrangement as described in the following is incorporated in the illustrated embodiment.

Figure 10:
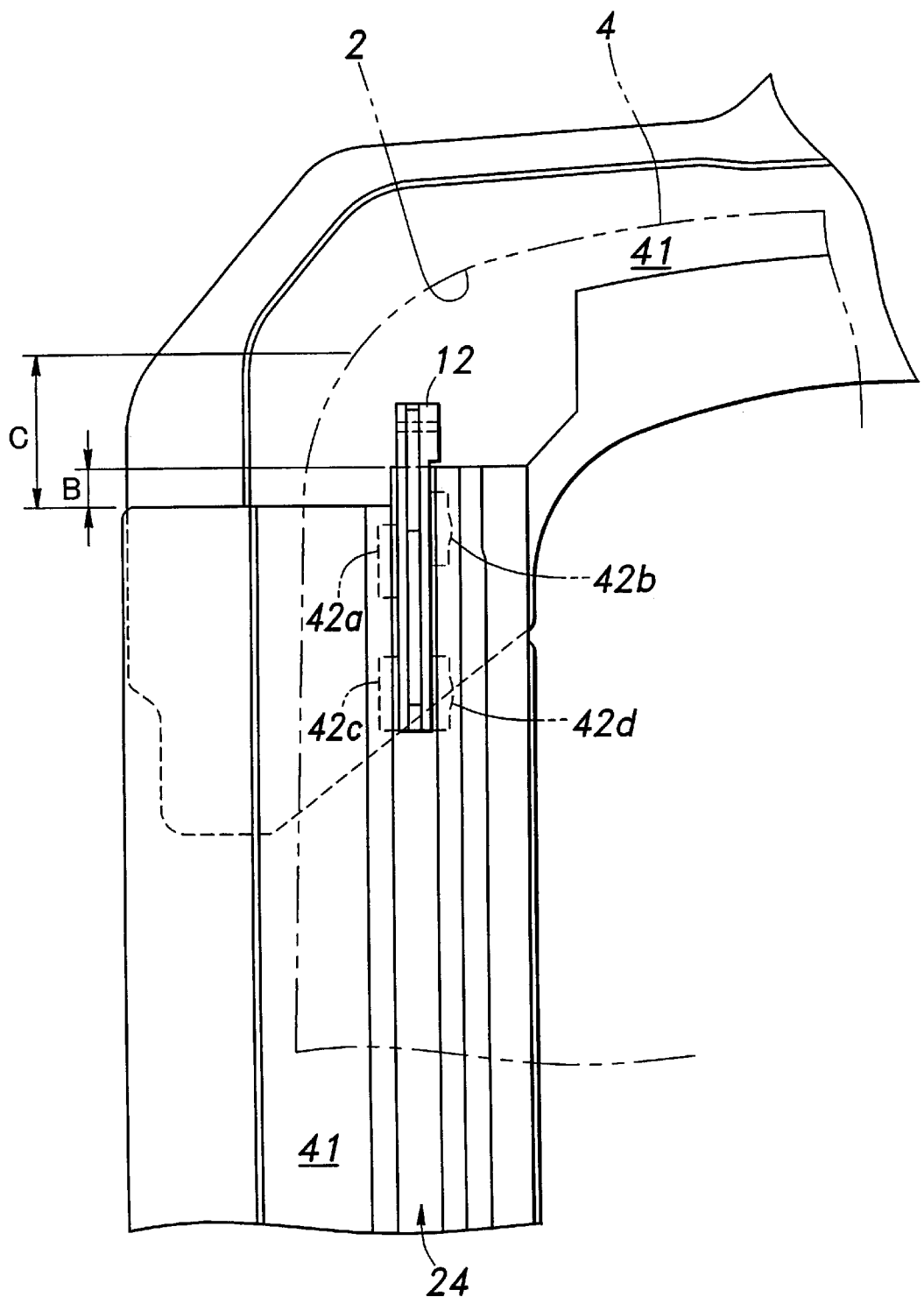
FIG. 10 is a schematic plan view of the front slider and an associated part of the fixed roof panel.

Referring to FIG. 10, the outboard side of the guide rail 24 is set back from the front end of the opening 2 of the fixed roof panel 1 by a distance C. The distance C is selected in such a manner that the moisture dripping from the fixed roof panel adjacent to the opening would not drop onto the guide rail 24. The front end of the guide rail 24 is provided with a stepped shape in such a manner that the inboard side corresponding to the inboard guide slots 22b and 23b is ahead of the outboard side of the guide rail 24 corresponding to the outboard guide slots 22a and 23a by a distance B. The front end of the inboard side of the guide rail is also adequately set back from the front end of the opening 2. As can be readily appreciated from FIG. 10, each corner of the opening 2 is rounded, and the distance C is defined as the distance between the front end of the outboard side of the guide rail 24 and the point of intersection between an extension of the outboard side of the guide rail 24 and the front periphery of the opening Referring FIGS. 10 and 11, the front slider 12 is provided with four laterally extending tongues 44a to 44d which are received in the corresponding guide slots 22a and 22b. The tongues include a pair of rear tongues 44c and 44d which are received by the outboard and inboard guide slots 22a and 22b at longitudinally aligned positions, and a pair of front tongues 44b and 44b which are similarly received by the outboard and inboard guide slots 22a and 22b but at longitudinally staggered positions, the outboard tongue 44b somewhat rearwardly set back from the inboard tongue 44b. The tongues are called as such in connection with the illustrated embodiment, but they may also consist of projections, rods or other members which cannot be normally called as tongues. Therefore, the term "tongue" as used in the disclosure and claims should be understood as meaning any such members that perform similar functions.

Figure 13:
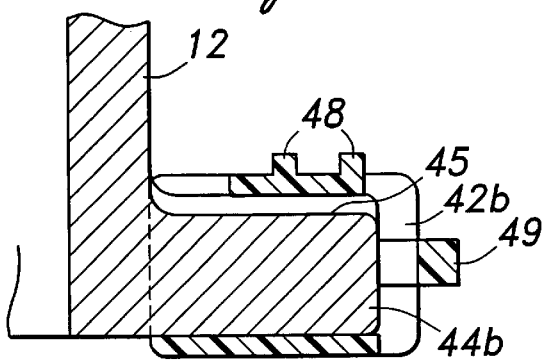
FIG. 13 is an enlarged sectional view showing the inboard slide shoe.
Figure 14:
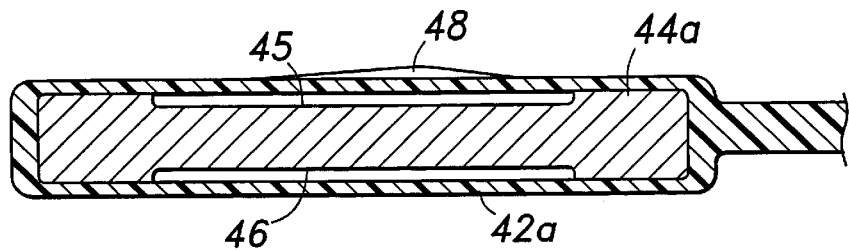
FIG. 14 is a fragmentary cross sectional view taken along line XIV—XIV of FIG. 10.
Figure 15:
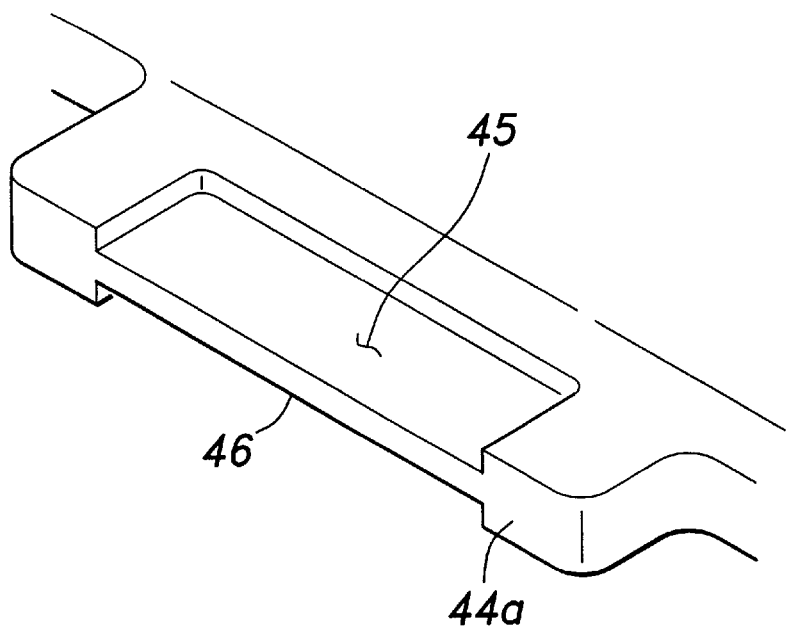
FIG. 15 is a fragmentary perspective view of a tongue member.

Each of the tongues 44a to 44d is provided with a rectangular recess 45 on a top surface thereof (FIGS. 13 to 15), and only the front inboard tongue 44a is additionally provided with a similar recess 46 on a bottom surface thereof (FIGS. 14 and 15). Each of the tongues 44b to 44d is fitted with a shoe 42a to 42d which is made of plastic material having a low frictional coefficient and resistant to wear. Each shoe covers the corresponding tongue with a single wall. The upper surface of each shoe is provided with a pair of ridges 48 extending in the fore-and-aft direction (FIGS. 13 and 14).

Figure 11:
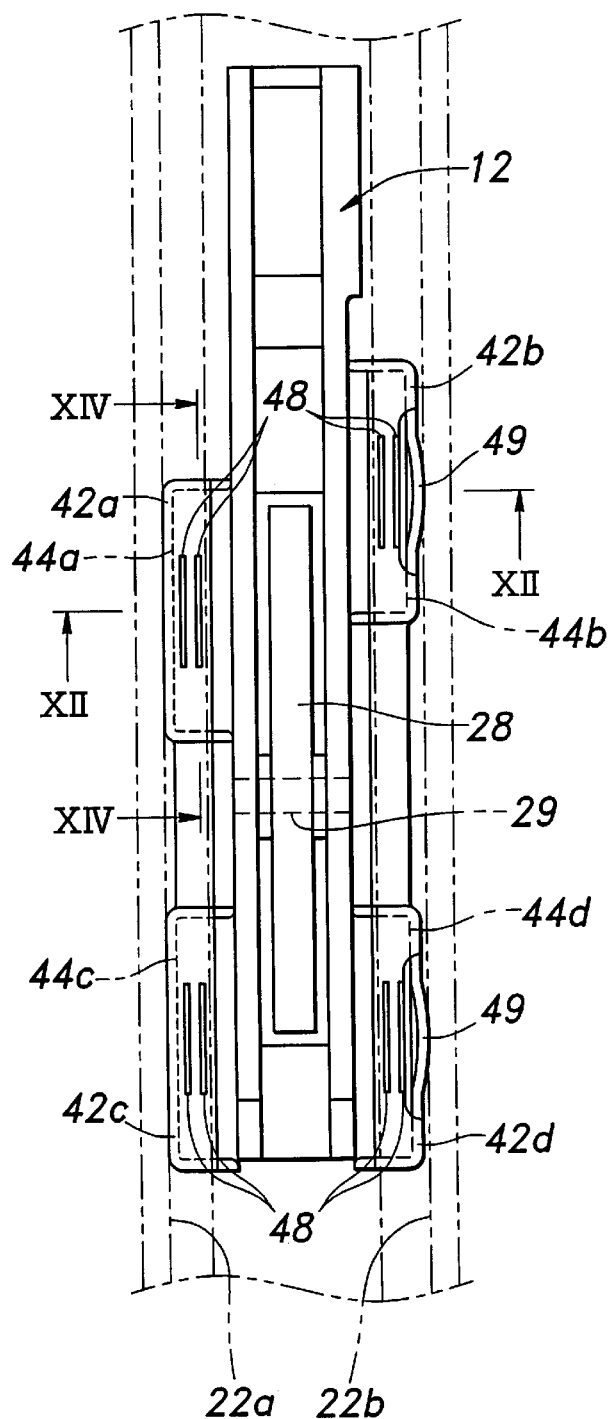
FIG. 11 is an enlarged plan view of the front slider.
Figure 12:
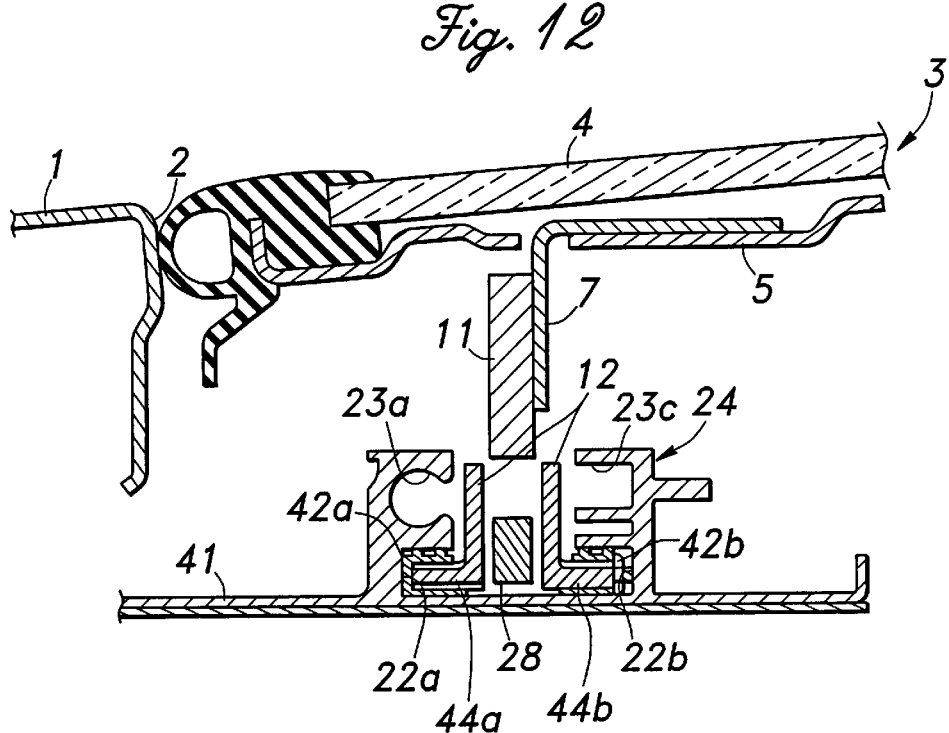
FIG. 12 is a fragmentary cross sectional view taken along line XII—XII of FIG. 11.

Therefore, when the upper surface of each shoe engages a corresponding part of the guide slot, the shoe can resiliently deform itself by the wall portion of the shoe being received in the recess 45 in the upper surface of the tongue. If the lower surface of the tongue is provided with a recess and the lower surface of the shoe engages a corresponding part of the guide slot, the shoe can resiliently deform itself by the wall portion of the shoe being received in the recess 46 in the lower surface of the tongue. Also, the side ends of the inboard shoes 42b and 42d are each provided with a resilient part 49 which consists of a curved strip of the material of the shoe and resiliently engages the bottom surface of the inboard guide slot 22b (FIGS. 11 and 12).

According to the illustrated slide shoe arrangement, the resilient parts 49 which are provided in the inboard sides of the inboard slide shoes 42b and 42d eliminate the lateral play between the guide rail 24 and the moveable panel 3 by resilient deformation, and this ensures a smooth movement of the moveable panel 3. Because the longitudinally middle part of the upper surface of each slide shoe which is provided with the pair of ridges 48 is enabled to deflect downwardly in a resilient manner by virtue of the recess 45, the vertical play between the guide rail 24 and the moveable panel 3 is eliminated, and this ensures a smooth movement of the moveable panel 3.

Figure 16:
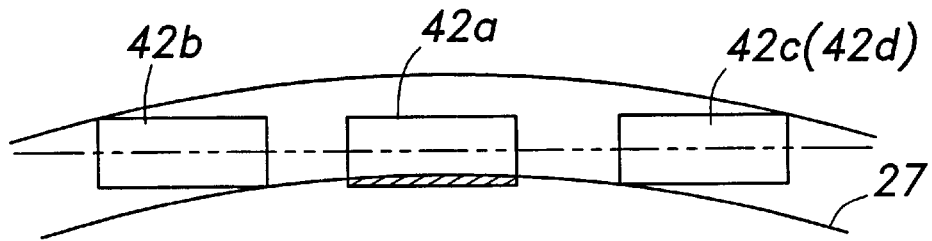
FIG. 16 is a schematic diagram illustrating the mode of interference between the slide shoe and the guide rail when a camber is present in the guide rail.

Because the front tongues 44b and 44b (front shoes 42a and 42b) are offset from each other in the fore-and-aft direction, the outboard front tongue 44b (shoe 42a) is located between the inboard front tongue 44b and rear tongues 44c and 44d (the inboard front shoe 42b and rear shoes 42c and 42d). Therefore, when there is a camber (a convex upper surface as seen from a side) in the guide rail 24, the middle shoe interferes with the top surface of the guide rail 24 as shown in FIG. 16 in a somewhat exaggerated manner, and this could prevent the smooth movement of the moveable panel. However, according to this embodiment, a recess 46 is formed in the lower surface of the outboard front tongue which is set back from the inboard front tongue so that the lower surface of the outboard front shoe may be able to deform upward. Therefore, this arrangement ensures a smooth motion to the moveable panel 3 even when there is a certain amount of camber in the guide rail 24.

Even when the guide rail 24 has an opposite camber or has a concave upper surface as seen from a side, because the tongues are each provided with a recess on an upper surface thereof, the upper surface of each shoe is provided with a certain resiliency, and this ensures a smooth motion to the moveable panel 3 even in such a case.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle sun roof system, comprising:

a fixed roof panel defining an opening having a rounded shape;

a pair of guide rails extending on said fixed roof panel in a fore-and-aft direction along either side of said opening; and a moveable panel having a pair of sliders on each side thereof, said sliders being slidably engaged by a corresponding one of said guide rails one in the front and the other in the rear;

each of said front sliders being provided with at least three laterally extending slide shoes including a front inboard slide shoe, a rear inboard slide shoe and a front outboard slide shoe located intermediate between said inboard slide shoes with respect to a fore-and-aft direction, said guide rail being provided with an inboard side defining an inboard guide slot and an outboard side defining an outboard guide slot adapted to receive the corresponding slide shoes, said outboard side of said guide rail being provided with a front end which is rearwardly offset from that of said inboard side of said guide rail.

2. A vehicle sun roof system according to claim 1, where each of said front sliders further comprises a rear outboard slide shoe provided on an outboard side of said front slider at a substantially same fore-and-aft position as said rear inboard slide shoe.

3. A vehicle sun roof system according to claim 1, wherein said front outboard slide shoe is provided with a resiliently deformable lower surface.

4. A vehicle sun roof system according to claim 3, wherein said front outboard slide shoe is fitted on a tongue member extending laterally from a main part of said front slider in an outboard direction, and a recess is formed in a bottom surface of said tongue member to provide a flexibility to a part of said outboard slide shoe extending over said recess.

5. A vehicle sun roof system according to claim 1, wherein said front inboard slide shoe and rear inboard slide show are each provided with a resiliently deformable upper surface.

6. A vehicle sun roof system according to claim 5, wherein each of said front and rear inboard slide shoes is fitted on a tongue member extending laterally from a main part of said front slider in an inboard direction, and a recess is formed in a top surface of said tongue member to provide a resiliency to a part of said inboard slide shoe extending over said recess.

7. A vehicle sun roof system according to claim 1, wherein at least one of said slide shoes is provided with a resilient portion on a side end thereof for resiliently engaging a bottom surface of a corresponding one of said guide slots.

8. A vehicle sun roof system according to claim 1, further comprising a lock lever pivotally supported by one of said front sliders via a laterally extending pin shaft and provided with a front end having a downwardly depending projection, and an engagement portion provided in a part of the corresponding guide rail for engaging said projection in a fully closed state of said moveable panel, said lock lever being provided with a cam surface for rocking said locking lever out of engaging from said engagement portion when a rear end of said moveable panel is tilted down as a step preliminary to a rearward slide motion, at least one of said engagement portion and said projection being provided with an overhang for securely engaging said projection with said engagement portion.

9. A vehicle sun roof system according to claim 8, wherein said engagement portion includes an opening formed in said guide rail.

10. A vehicle sun roof system according to claim 1, wherein said guide rail includes a vertical slot for guiding a laterally extending pin shaft attached to a rear part of said moveable panel to tilt down a rear end of said moveable panel and a horizontal slot extending rearward from a lower part of said vertical slot to accommodate a rearward sliding movement of said moveable panel, said guide rail including a section made of a separate member which defines at least a part of said vertical slot and a part of said horizontal slot connected to the lower part of said vertical slot.

11. A vehicle sun roof system according to claim 10, wherein said separate member includes a part made of plastic material.

* * * * *